United States Patent [19]

Jondrow et al.

[11] Patent Number: 5,416,479
[45] Date of Patent: May 16, 1995

[54] HANDLE FOR POSITION ENCODER SYSTEM

[75] Inventors: Timothy J. Jondrow; Michael D. Derocher, both of Corvallis, Oreg.

[73] Assignee: Hewlett-Packard Corporation, Palo Alto, Calif.

[21] Appl. No.: 3,373

[22] Filed: Jan. 12, 1993

Related U.S. Application Data

[63] Continuation-in-part of Ser. No. 919,483, Jul. 24, 1992, which is a continuation-in-part of Ser. No. 856,436, Mar. 23, 1992.

[51] Int. Cl.$^6$ .................. H03K 17/94; G06F 3/033; G06K 11/06
[52] U.S. Cl. .................... 341/20; 345/157; 364/188; 361/679
[58] Field of Search .......... 341/20; 345/163, 169, 345/157, 163, 161, 184; 364/188–190, 708.1, 709.01, 709.08, 709.09, 709.11; 361/600, 679, 683, 724–727, 752, 754

[56] References Cited

U.S. PATENT DOCUMENTS

| | | |
|---|---|---|
| 4,420,754 | 12/1983 | Andermo . |
| 4,453,316 | 6/1984 | Marveggio . |
| 4,581,676 | 4/1986 | Baxter et al. . |
| 4,680,577 | 7/1987 | Straayer et al. . |
| 4,743,902 | 5/1988 | Andermo . |
| 4,782,327 | 11/1988 | Kley et al. . |
| 4,798,004 | 1/1989 | Suzuki . |
| 4,823,364 | 4/1989 | Herzog . |
| 4,838,585 | 6/1989 | Jondrow ........................ 292/8 |
| 4,896,554 | 1/1990 | Culver . |
| 4,935,728 | 6/1990 | Kley . |
| 4,959,615 | 9/1990 | Andermo . |
| 5,049,863 | 9/1991 | Oka . |
| 5,126,955 | 6/1992 | Tomoda . |
| 5,172,485 | 12/1992 | Gerhard et al. . |

FOREIGN PATENT DOCUMENTS

| | | |
|---|---|---|
| 0404975A1 | 1/1991 | European Pat. Off. . |
| 0404980A1 | 6/1991 | European Pat. Off. . |
| 0435429A1 | 7/1991 | European Pat. Off. . |
| 266360 | 10/1993 | United Kingdom . |

OTHER PUBLICATIONS

Electronics Week, Jul. 23, 1984, p. 26, "'Puck Pointer'-Combines Functions of Mouse and Joystick in Number-Pad Sized Package".
PC Magazine, Aug. 1987, pp. 95–96, 99–101, 105–106, 117–120, 159–161, 183–185, 199–200.
"Lightgate Input Device Offers More Intuitive, Precise Interface" Info-World, Dec. 14, 1987, 2 pages.
1-Page article entitled "A Different Kind of Animal", ALTRA, circa 1/1992.
2-Page brochure entitled "Push-n-Point" Home Row, Inc.; Apr., 1991.
"The Mouse Ran Under The 'J'", Electronic Engineering Times; Jul. 2, 1990.
"Thumb-actuated, Cursor-positioning Devices Provides 2-D Axis Control in a Small Space" ALPS Electric U.S.A., Product Update, EDN, Feb. 1989.
News Release by ALPS Electric (USA), Inc. entitled "ALPS Electric Introduces New Cursor Control Device for Laptops," released Nov. 14, 1988—2 pages.
Mitutoyo "Digimatic Caliper" instruction sheet; Series 500, 550, 551; Manual No. 2035, circa 1/1992.
Service Manual, HP9111A Graphics Tablet, Section VI, 27 pages, Hewlett Packard Co., circa 1/1992.
"Development of A Capacitive Measuring System for Workshop Measuring Instruments", Fred V. Fowler Co. Inc., 10/85, 8 pp.
"Field Mice, Different, Yes., Better, Maybe"; PC Magazine, Oct. 15, 1991; pp. 111–133.

(List continued on next page.)

*Primary Examiner*—Jeffery A. Hofsass
*Assistant Examiner*—Andrew Hill

[57] ABSTRACT

The handle is arranged to be expanded from a compact, collapsed configuration, into an expanded configuration for comfortable manipulation by the user. Upon completion of the use of the handle, the handle is collapsed to the compact configuration for stowage in the computer.

20 Claims, 5 Drawing Sheets

OTHER PUBLICATIONS

"Isn't It Time We Get Serious About Laptop Pointing Devices?", Article by John Dickinson; Apr. 1991, p. 46.

"Input Alternatives—How and Why to Choose a Better Pointing Device" by Franklin N. Tessler; MacWorld, Jun. 1992;—pp. 154–159.

"Display–Selection Techniques for Text Manipulation" by William K. English, Douglas C. Engelbart & Melvyn L. Berman; IEEE Transactions on Human Factors in Electronics; 3/67.

"Fingertip Mouse Control Without Leaving Your Keyboard"; May 1991; PC World, p. 103.

"Fresh Ways to TALK to Your Computer", Design News, Feb. 25, 1991, pp. 83–86.

"Touchman —The World's First Stationary Mouse" Agiler, 5-page brochure; Sep. 14, 1990.

"Notebooks Need Portable Pointer–Increasing Importance of Graphical Interface Urges Portables to Comply"; Infoworld; Jun. 17, 1991, p. 21.

"The Twiddler" Handykey Corporation brochure, copyright 1/1991.

Pointing Device Specification Sheets, 3 pages–Jun. 3, 1991.

Two page specification sheet, Fujitsu Ltd., Pivoting Dome Pointing Device Jul. 16, 1991.

Micro Track Ball; ALPS Electric Co. Ltd., 1 page specification, circa 1/ 1992.

HANDLE FOR POSITION ENCODER SYSTEM

This application is a continuation-in-part of U.S. patent application Ser. No. 07/919,483, filed Jul. 24, 1992, which is a continuation-in-part of U.S. patent application Ser. No. 07/856,436, filed Mar. 23, 1992.

TECHNICAL FIELD

The present invention is directed to a handle that is used with a position encoder system as an input device for a computer.

BACKGROUND INFORMATION

Computer keyboards are often supplemented with other types of input devices. Some of these supplemental input devices, such as a trackball or mouse, include components that are moved by the user. Encoder mechanisms detect motion of the movable components and provide to the computer digital information representative of movement of the trackball or mouse. This information is typically used by the computer for controlling the movement of a cursor or pointer on a computer display screen.

A mouse is connected to a computer by a flexible cable. The mouse houses a ball that is rolled along a surface adjacent to the computer. Use of a mouse with portable, compact, "notebook" type computers is inconvenient because the mouse must be transported as a separate component. The user must attach the mouse each time the computer is used and detach it when finished.

Some input devices, such as trackballs, may be built into portable computers. Built-in devices have been mounted in the vicinity of the computer keyboard, with the movable component projecting from the upper surface of the keyboard. Devices so mounted to the keyboard necessarily require keyboard surface space, a requirement that is generally contrary to design goals that seek to minimize the keyboard size to make the computer as compact as possible.

SUMMARY OF THE INVENTION

The present invention is directed to a handle that is used with a position encoder system as an input device for a computer. The handle may be stowed in a compact, collapsed configuration within the computer when not in use. The handle is extended next to the computer for use as an input device. In the extended position, the handle may be expanded from the compact configuration to provide a comfortable device for manipulation by the user.

DESCRIPTION OF A PREFERRED EMBODIMENT

Figure 1:
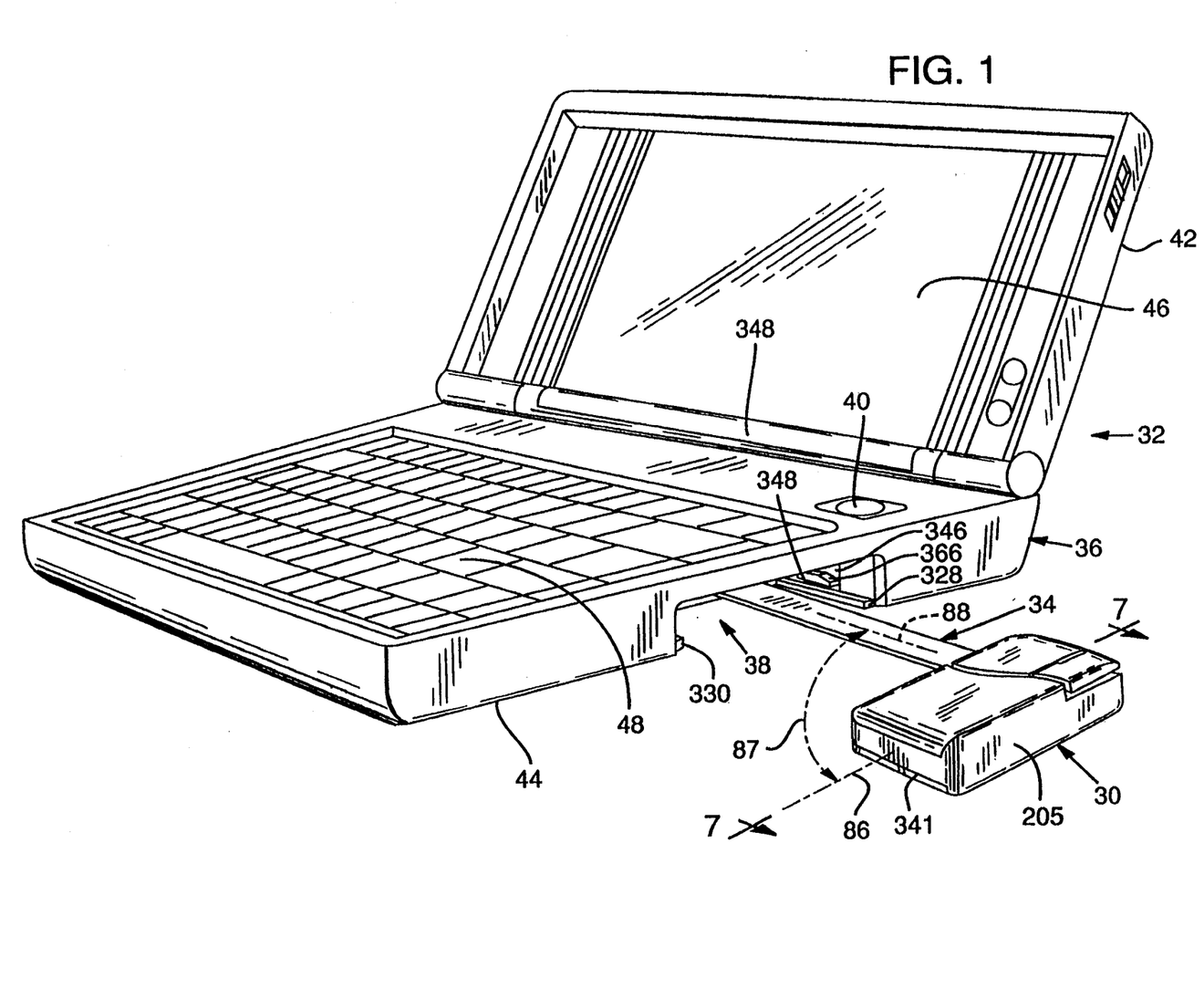
FIG. 1 is a perspective view of a compact notebook-type computer, depicting the handle of the present invention and the compartment in which the handle is stowed.

FIG. 1 shows a preferred embodiment of a handle 30 that is connected to a computer 32 by a link 34 for use as an input device for the computer. FIG. 1 shows the handle 30 in a position extended from the computer.

The computer housing 36 includes a stowage compartment 38 into which the handle 30 may be inserted and stowed when not in use. Whenever an eject button 40 is depressed by the user, the handle 30 is ejected from the stowage compartment 38 for manipulation by the user. Movement of the handle 30 is sensed by a sensing system, which encodes the motion of the handle 30 and provides to the computer 32 digital information representative of the position of the handle. This information is made available to the computer for conventional applications, such as controlling the movement of a cursor or pointer on the computer display screen 46.

The sensing system is described in detail in U.S. patent application Ser. No. 07/856,436, to which the present application is related. The sensing system described in that application comprises a capacitive-coupling-type sensing system that provides very high resolution while consuming relatively little power. In another related U.S. patent application Ser. No. 07/919,483, filed Jul. 24, 1992, there is described a capacitive-coupling-type switch interconnect system that interconnects the computer and the switches that are carried on the handle. The handle of the present invention is adaptable for use with the just-mentioned sensing system, or with any other position encoder system for which a collapsible handle may be useful.

Figure 2:
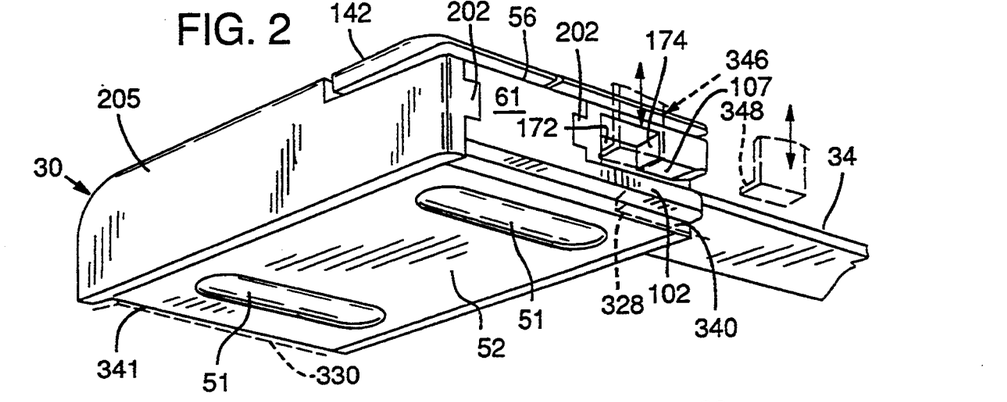
FIG. 2 is a perspective view of the handle, illustrating mechanisms for latching the handle inside the stowage compartment of a computer.

With reference to FIGS. 1 and 2, the computer 32 may be any one of a variety of types, such as the notebook-type shown in FIG. 1. The computer 32 is compact and portable and can be powered by battery. The housing 36 of the computer is characterized by a top 42 that is hinged to a base 44. The top 42 includes a display screen 46. The base has mounted to it a keyboard 48 that serves as the primary input device for the computer. The microprocessor and memory components required for the computer 32 are housed within the base 44.

The link 34 is connected to move with the handle 30. The above-mentioned sensing system determines motion of the handle 30 by sensing the corresponding motion of the link 34 as the link moves relative to sensing components that are contained within the base 44, as described in U.S. patent application Ser. No. 07/856,436.

When the handle is extended (FIG. 1) from the computer stowage compartment, the handle may be manipulated by the user and the corresponding motion of the handle (and attached link) is sensed and correlated to the motion of a cursor on the display screen 46. In FIG. 1, the handle is depicted in a compact, collapsed configuration. In the collapsed configuration, the handle 30 fits completely within the stowage compartment 38 of the computer base 44 as described more fully below.

Figure 8:
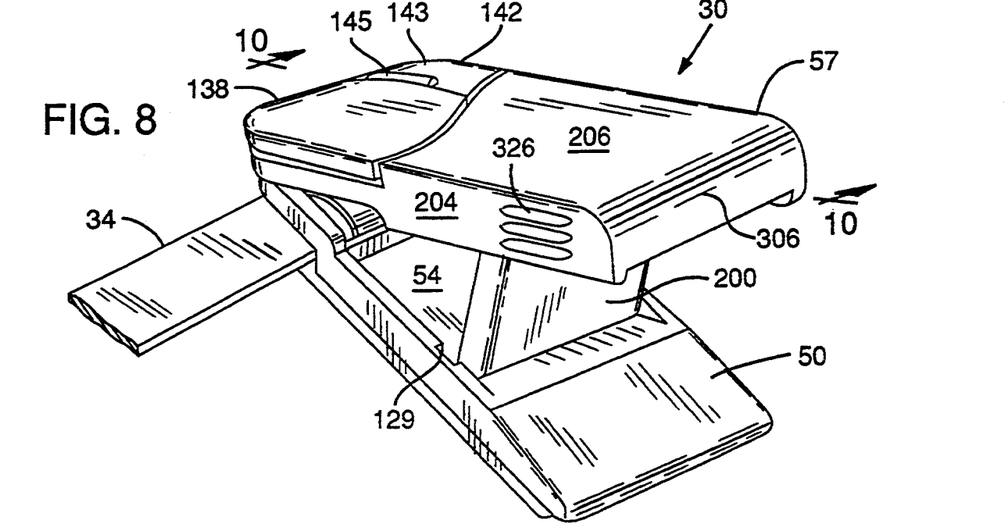
FIG. 8 is a perspective view of the handle, showing the handle in the expanded configuration.
Figure 9:
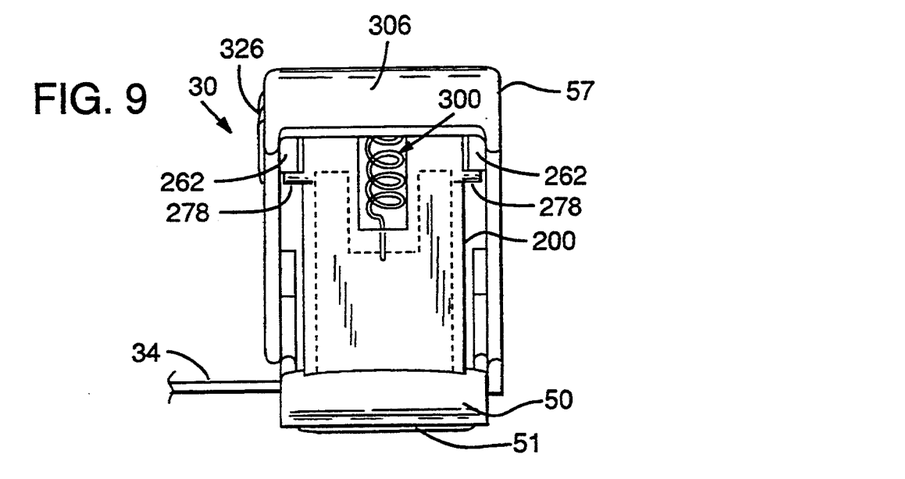
FIG. 9 is a rear end view of the handle in the expanded configuration.

The extended handle 30 may be manipulated by the user for the cursor control purposes mentioned above, when the handle is in the collapsed configuration. In the preferred embodiment, the handle 30 generally comprises two parts that are hinged near the forward end of the handle so that the collapsed handle (FIG. 1) can be reconfigured into an expanded configuration as shown in FIG. 8. While in the expanded configuration, the handle presents an overall larger size for comfortable manual control of the handle without the finger and hand strain that might otherwise occur if the handle were used in the collapsed configuration for extended periods of time.

When necessary to stow the handle 30, it is easily returned to its compact configuration and inserted into the stowage compartment 38.

With reference to FIGS. 1-4, the handle 30 includes a plastic base 50 that is generally rectangular as viewed from above. The handle 30 is sized so that the undersurface 52 (FIG. 2) of the base is generally coplanar with the bottom surface of the computer base 44. A pair of spaced-apart pads 51 are attached to the undersurface 52 to facilitate sliding of the handle 30 on a table surface. The pads 51 each comprise an oval shaped, adhesive-backed thin layer of an ultra-high molecular weight polyolefin, such as manufactured by CHR Industries and designated #P631. As best shown in FIG. 7, the undersurface 52 includes two recesses into which fit the pads 51, the adhesive side of the pads contacting the surface 52. Each recess is crowned so that the edges of the pads 51 are completely received in the recess, but the central outer surface portion of each pad protrudes from the plane of the undersurface 52 to provide the contact surfaces along which the handle is slid. It will be appreciated that any number of undersurface treatments may be used. For example, the pads 51 or the surface 52 may be made of a fluoropolymer, such as TEFLON, manufactured by DuPont, to provide a nonstick, abrasion-resistant surface to facilitate sliding of the handle 30 on a table surface.

The base 50 comprises two components, a bottom member 53 and a cover 55 (FIG. 4), that fit together to secure to the base the outer end 35 of the link 34 as described later.

Figure 4:
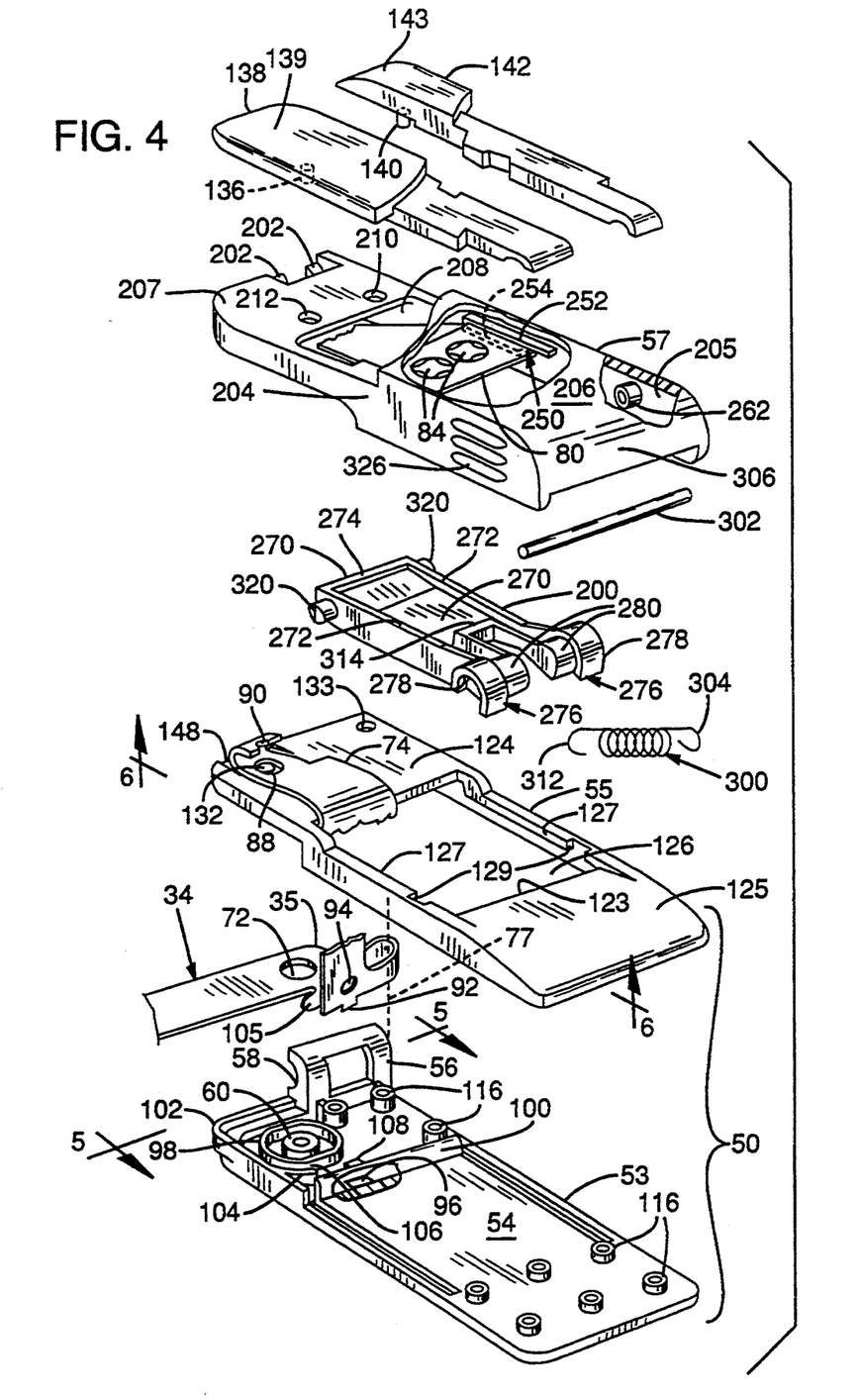
FIG. 4 is a perspective, exploded view of the handle.
Figures 5, 7:
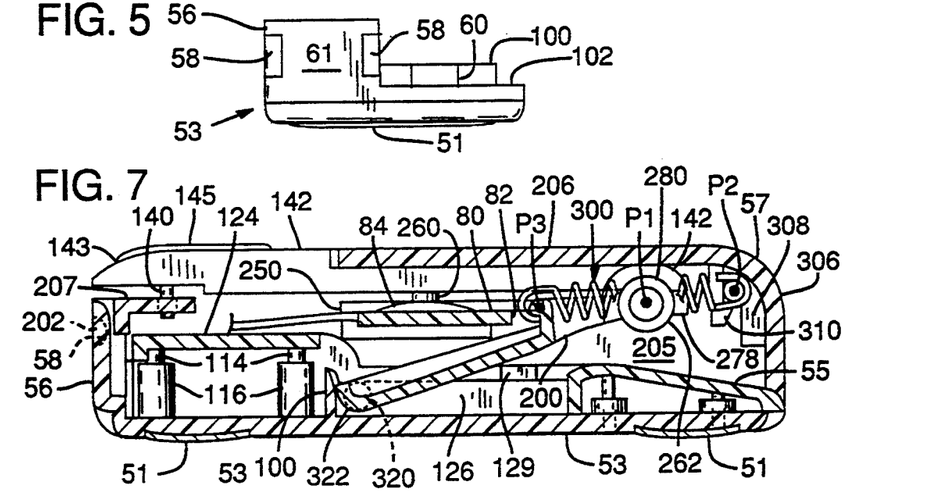
FIG. 5 is a front end view, taken along line 5—5 of FIG. 4, of the bottom component of the base of the handle.
FIG. 7 is a cross sectional view taken along the line 7—7 of FIG. 1, showing the handle in the collapsed configuration. For clarity, one keycap 139 is omitted from this figure.

The upper surface 54 of the bottom member 53 has formed on it a number of features, including an upwardly projecting hinge bracket 56 carried on its forward, right-hand side (as viewed in FIG. 4). The hinge bracket 56 includes a semi-cylindrical recesses 58 formed in opposite sides of the forward surface 61 of the hinge bracket 56 (FIG. 5). The hinge bracket 56 mates with hinge projections 202 formed in a top case 57 of the handle to provide the hinged expansion of the handle described below.

The upper surface 54 of the handle bottom member 53 also includes an upwardly protruding, tubular pivot post 60 to which the outer end 35 of the link 34 is pivotally attached. A description of the particulars of the link 34 (FIG. 3) is next provided, before the description of the link/handle attachment.

One preferred embodiment of the link 34 is described in detail in U.S. patent application Ser. No. 07/856,436.

In the presently preferred embodiment, the link generally comprises a flat, elongated member formed of an injection-molded nylon 6/6 with 10% PTFE filler core of about 0.61 mm thickness. Adhered to the undersurface of the core is a 0.051 mm polyimide film, such as that manufactured under the trademark KAPTON by DuPont, that carries on it a electrically conductive, patterned layer that makes up a component of the sensing system mentioned above. That electrically conductive pattern layer is covered with a thin opaque-plastic layer of about 38 micrometers thick.

Three adjacent, electrically conductive strips 62, 64, 66 are carried on the upper surface (shown in FIG. 3) of the link 34 for conducting switch-state signals from the handle to the computer as described in U.S. patent application Ser. No. 07/919,483. Specifically, a 0.051 mm thick polyimide film, such as manufactured by DuPont under the trademark KAPTON, is laminated to the upper surface of the link core. The film has applied to it copper traces that define the conductive strips 62, 64, 66.

Figure 3:
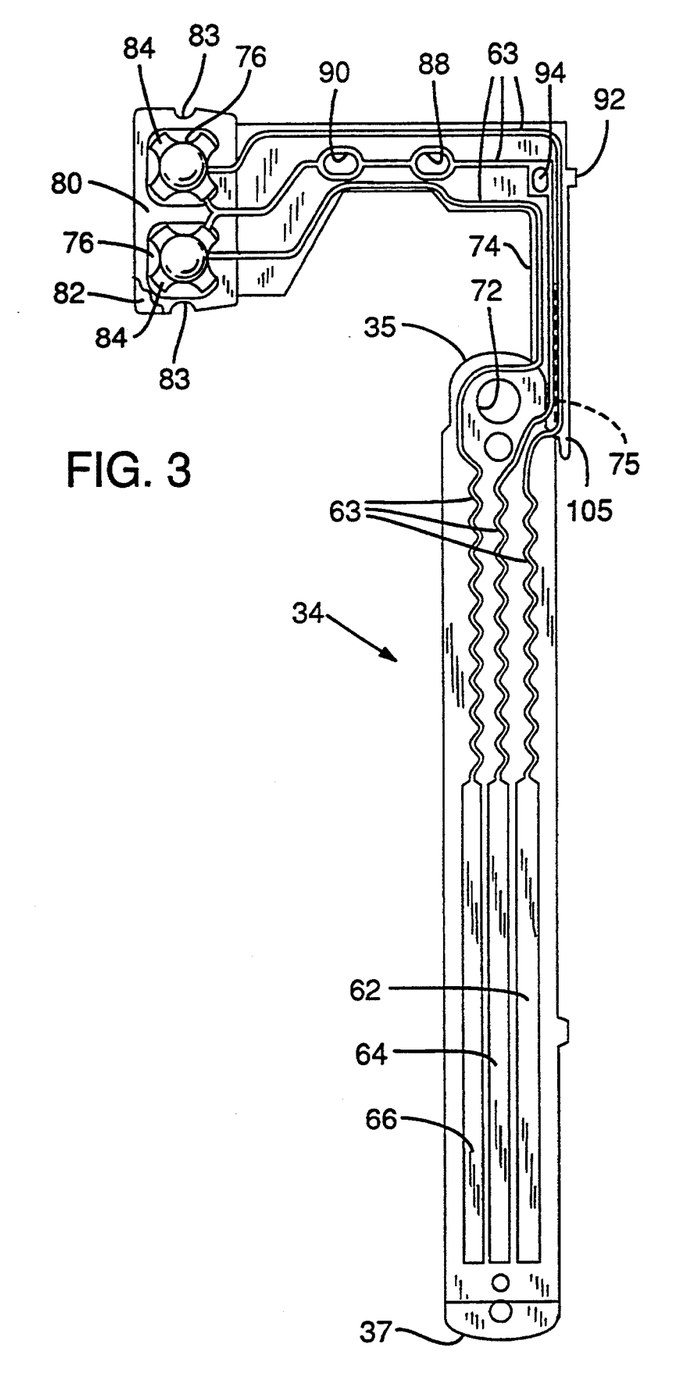
FIG. 3 is a top view of a link for connecting the handle and computer, illustrating the link prior to assembly.

Each strip 62, 64, 66, extends along the length of the link 34 from the inner end 37 of the link to a location near the midpoint of the link, whence the strips are substantially narrowed and spaced apart and continue as sinuous patterns 63 extending to the outer end 35 of the link 34. The outer end 35 of the link 34 includes an aperture 72 through which fits the pivot post 60 on the bottom member 53 of the handle base 50.

The outer end 35 of the link includes a generally elongated extension piece 74. That piece 74 generally comprises an extension of the polyimide film and patterns 63 carried on the upper surface of the link as mentioned above. The link extension piece 74 extends for about ⅓ of its length along the line generally parallel to the long axis of the link 34, whence it angles 90° and extends for the remaining ⅔ of its length.

The link extension piece 74 terminates in a generally rectangular switch piece 80. The upper surface of the switch piece 80 includes two exposed contact patterns 76 on each of which pattern is mounted a normally-open snap-dome switch 84. The conductors comprising pattern 63 extend along the extension piece 74 to connect with those patterns 76. In a preferred embodiment, two such switches and contact patterns 76 are arranged so that either or both switches may be closed (the central trace of pattern 63 being connected to be common with the patterns 76).

Preferably, the metallic snap-dome switches 84 are completely covered with a thin plastic film, such as a 0.025 mm layer of TEDLAR, to minimize the chance of electro-static discharge to the conductors.

Preferably, a thin, plastic stiffener piece 82 is bonded to the underside of the switch piece 80 for the purpose of rigidly supporting that piece 80 for attachment to the top case 57. To this end, a notch 83 is formed in each short end of the stiffener piece 82 and overlying portion of the switch piece 80 (hereafter the pieces 80 and 82 are collectively referred to as the stiffened switch piece 80). Preferably, the width of the stiffened switch pieces 80 between the notched ends is tapered slightly in the direction toward extension piece 74, thereby to facilitate attachment of the stiffened switch piece 80 to the top case 57, as described below.

The extension piece 74 has formed through it two clearance holes 88, 90 arranged so that when the extension piece is folded about a lateral line extending midway between those holes, the holes will align to provide a clear path through the extension piece 74 as described more fully below.

Near the 90° angle of extension 74, a small tab 92 protrudes outwardly in a direction away from the switch piece 80. A through-aperture 94 is formed through the extension piece 74 near the tab 92. The aperture 94 and the tab 92 are used for facilitating assembly of the handle base 50 and link 34 as described next.

The outer end 35 of the link is prepared for assembly by bending the extension piece 74 downwardly along the junction 75 (dashed line in FIG. 3) of the extension piece 74 and the outer end 35 and the link 34. So bent, the portion of the flat extension piece 74 adjacent the link aperture 72 is generally in a plane perpendicular to the upper surface of the link 34 (See FIG. 4). A protruding tab portion 105 of the extension piece 74 extends in this plane for guiding motion of this bent portion of the link as described below. The extension piece is then folded back about line 77 (dashed line in FIG. 4) against itself. Next, the link 34 and adjacent portion of the bent and folded extension piece 74 are moved to the handle bottom member 53 so that the aperture 72 in the link 34 fits around the pivot post 60, and so that the tab 92 fits into an opening 96 (FIG. 4) formed in the surface 54 of the handle bottom member 53 near the pivot post 60.

A thin wall 98 protrudes upwardly from the surface 54 of the bottom member 53 to surround the pivot post 60. Spaced slightly to the rear (FIG. 4) of the wall 98 is a thin straight rib 100 protruding upwardly from that surface 54 laterally across substantially the width of the bottom member 53, each end of the rib spaced slightly away from the outermost lateral edges of the bottom member. A small nib 108 is formed to project forwardly from the rib 100, centered over the opening 96 formed in the bottom member surface 54.

The left forward edge of the handle bottom member is raised to define a generally L-shaped corner side wall 102 extending from the hinge bracket 56. The height of the corner side wall 102 matches the height of the wall 98 from the surface 54. The corner side wall 102 is aligned with the edge of the bottom member 53, except for a curved portion 104 formed therein that diverges inwardly from the side wall and terminates at a location very near the rib 100.

Between the pivot-surrounding wall 98 and the rib 100 there is defined a channel 106 that extends forwardly in the space between the wall 98 and the curved portion 104 of the side wall 102. The above-described folded portion of the link extension piece 74 fits against the rib 100 so that the tab 92 fits into the opening 96 and so that the nib 108 extends through the aperture 94 in the extension piece. The tab 105 protrudes within the channel 106 in a manner such that the channel serves as a guide for generally maintaining the 90° bend in the extension piece (about line 75) throughout pivotal motion of the handle, thereby to avoid stress on the conductive traces that extend through the bend.

The tendency of the folded extension portion to straighten holds this portion within the channel 106, pressing against the rib 100, while the mating nib 108 and aperture 94 prevent this folded portion from lifting from the bottom member 53 during assembly. The cover 55 of the base 50 is then fit over the bottom member 53 to secure the outer end 35 of the link 34 pivotally in place with the adjacent end of extension piece 74 arranged as just described.

Figure 6:
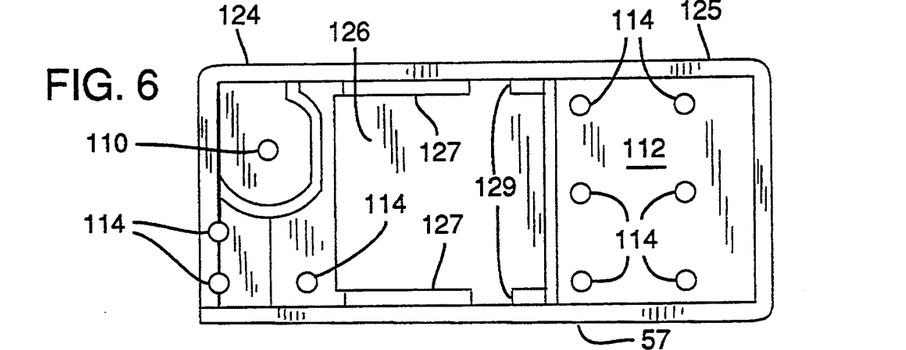
FIG. 6 is a bottom view, taken along line 6—6 of FIG. 4, showing the underside of a cover component of the handle base.

With reference to FIGS. 4 and 6, the cover 55 is a generally rectangular member sized to match the overall size of the bottom member 53. The forward-most end of the bottom cover 55 is, however, spaced slightly rearwardly of the forward-most end of the bottom member 53, thereby to provide clearance for the hinge bracket 56 and for defining a slot arrangement for receiving a latch as described more fully below.

A pin 110 extends from the underside 112 of the cover (FIG. 6) to be received within the central bore of the tubular pivot post 60. Several additional pins 114 also protrude from the cover underside 112. An arrangement of nine pins 114 are shown near the rear segment 125 of the cover. These pins mate with hollow cylindrical bosses 116 formed to protrude from the rearward, upper surface 54 of the bottom member 53. An additional group of three hollow bosses 116 are formed in the forward portion of surface 54 behind the pivot bracket 56 to correspond with pins 114 that protrude from the underside 112 of the forward segment 124 of the cover 55.

All of the pins 114 and bosses 116 are sized to provide an interference fit for securing the cover 55 to the bottom member 53.

To the rear of the thin rib 100 the edges of the cover 55 protrude downwardly to generally abut the surface 54, thereby to define substantially continuous, smooth side surfaces of the handle base 50. The forward, left corner of the cover 55 extends in spaced relation above the top of the pivot-surrounding wall 98 and the top edge of the sidewall 102 of the bottom member, thereby to define a slot 107 (see FIG. 2) through which fits the outer end of the link 34.

With the cover 55 attached to the bottom member 53, the link 34 is able to pivot about the pivot post 60, and the folded portion of the link extension piece that is beneath the cover is able to roll (that is, the position of fold line 77 changes along the extension piece) with such pivotal motion so that no tension is created in the flexible extension piece as the handle 30 is pivoted relative to the link 34. In a preferred embodiment, the cover 55, link 34, and bottom member 53 are configured so that the handle 30 may pivot about the post 60 relative to the link by an amount such that the angle 87 (FIG. 1) swept by the long axis 86 of the handle relative to the long axis 89 of the link is about 50°.

The central ⅓ of the cover 55 defines a central opening 126 to expose the smooth midportion of the surface 54 of the bottom member 53 when the cover is attached. The flexible extension piece 74 fits between the small slit that is defined between the upper edge of the rib 100 and the segment 124 of the cover that is forward of the central opening 126 in the cover 55. The portion of the extension piece 74 that fits through the slit is bent to overlie the left, upper surface of the forward segment 124 of the cover (See FIG. 4). The flexible extension piece 74 is then bent near the forward-most edge 148 of the forward segment 124 so that the extension piece 74 overlies itself with the two clearance holes 88, 90 in that piece lying in a generally coaxial relationship.

The coaxially-aligned holes 88, 90 are generally concentric with a cylindrical depression 132 formed in the upper surface of the cover segment 124. The depression provides clearance for the tip of an alignment post 136 that protrudes from the underside of the left keycap 138, as described more fully below. Another cylindrical depression 133 is formed in the surface of the forward segment 124 to the rear of the hinge bracket 56 for providing clearance for the tip of another alignment post 140 that protrudes downwardly from the underside of a right keycap 142.

The portion of the forward-most edge 148 of the forward segment 124 that lies beneath the bend in the extension piece 74 is beveled, thereby to increase the clearance between the cover 55 and the top case 57 in the vicinity where the extension piece 74 is thickened as a result of the bend.

The lateral edges that define opening 126 include inwardly projecting lips 127 at the upper surface of the cover 55. These lips are continuous along the length of the opening, except for notches 129 formed through the lips on opposing sides of the opening. The notches permit assembly of the base 50 and strut 200, as described more fully below.

The top case 57 is hinged to the base 50, and includes features for securing the two switches 84 beneath the finger-operated left keycap 138 and the right keycap 142. The top case 57 also carries a spring-biased strut 200 that is used for supporting the top case in an expanded position (conforming to the expanded configuration of the handle). The strut 200 may be swung into a stowed position within the top case 57 to allow the top case to move into a collapsed position (conforming to the collapsed configuration of the handle).

More particularly, the forward right side of the top case includes two opposed half-round projections 202 (FIGS. 2 and 4) that fit within the semi-cylindrical depressions 58 formed in the hinge bracket 56. To the left of the hinge projections (that is, to the right in FIG. 2) the forward end of the top case is shaped to define the continuation of the slot 107, having an inwardly-sloping entry at the forward, left corner of the handle. The lower boundary of slot 107 is defined by the top edge of the side wall 102 mentioned earlier. The inner, forward end of the slot 107 is contiguous with a recess 172 that is formed in the front of the top case 57 to extend upwardly from the slot 107. The recess 172 provides clearance for the toe portion of a latch described more fully below.

Along the forward left side of the top case 57, the top case side wall 204 extends downwardly by an amount such that there is maintained the slot 107 through which the link 34 passes for pivotal connection as mentioned above.

Forward of the upper surface 206 of the top case 57 there is provided a flat recessed surface 207. The forward tip 143 of the right keycap 142 extends over this recessed surface. Rearward of the tip 143, the right keycap extends through a cut-out 208 in the top case and lies just beneath the underside of the upper surface 206 of the top case. Similarly, the left keycap 138 extends through the cut out 208, with its tip 139 extending over the recessed surface 207, the remainder of the keycap 138 extending beneath the surface 206.

In a preferred embodiment, the line across the top surface 206 of the case that defines the forward end of that surface is gently curved, with the result of providing a greater area for the tip 139 of the left keycap 138 then for the tip of the right keycap 142. An upwardly protruding ridge 145 is formed on the right keycap 142 near the edge that is adjacent the left keycap 138 so that the user can easily determine by feel each separate keycap.

The right keycap 142 includes the downwardly protruding alignment post 140 that extends through a guide hole 210 formed through the forward recessed surface 207 of the case 57. The tip portion of the post 140 that protrudes through the guide hole 210 fits within the cylindrical depression 133 formed in the forward segment 124 of the cover 55 whenever the keycap is depressed by the user. The alignment post 140 and associated guide hole 210 prevent undesirable lateral shifting of the tip 143 of the right keycap 142 relative to the top case 57 as the keycap is depressed.

The similar alignment post 136 that is formed on the underside of the left keycap 138 protrudes through a guide hole 212 formed through the recessed surface 207 of the top case. The tip portion of the alignment post 136 that protrudes through the guide hole 212 passes through the aligned clearance holes 88, 90 in the extension piece 74 and fits in the depression 132 formed in the base cover 55. The alignment post 136, therefore, limits lateral shifting of the left keycap, and serves to anchor the folded portion of the extension piece 74 (as a result of passing through the clearance holes 88, 90) in the space between the base cover 55 and top case 57.

With reference to FIGS. 4 and 7, each opposing side wall 204, 205 of the top case 57 has formed on the inner facing surface a bracket 250 for securing an end of the stiffened switch piece 80 that carries the switches 84. Each bracket 250 comprises an upper shelf 252 and a spaced-apart lower shelf 254, those shelves being joined at the forward end of the bracket 250. The shelves 252, 254 are spaced apart so that the short sides of the stiffened switch piece 80 fits snugly between those shelves. Inwardly protruding nibs (not shown) extend between the shelves 252, 254 to seat within the notches 83 formed in the stiffened switch piece 80. The tapered side portions of the switch piece, described above, facilitate the forward sliding action of the switch piece between the shelves of the bracket 250 until the nibs snap into the notches 83.

As best shown in FIG. 7, when the stiffened switch piece 80 is fit between the two brackets 250 carried in the top case 57, each snap-dome type switch 84 is centered below and supports a downwardly protruding actuator boss 260, one boss fastened to protrude downwardly from each keycap 138, 142. Accordingly, whenever a keycap is depressed by the user, the actuator 260 depresses the dome to close the switch 84.

A number of alternative approaches may be taken for securing the stiffened switch piece 80 in the location just described. For example, the piece 80 could be heat-staked to plastic bosses, or fastened by screws.

Near the rear wall 306 of the top case 57, each side wall 204, 205 is formed to include an inwardly projecting, hollow cylindrical pivot boss 262 (FIG. 4). The bosses 262 define the axis about which the strut 200 is pivotally attached to the top case.

The strut 200 includes a generally rectangular body 270 that has on its upper surface (that is, the surface facing the top case 57) raised side edges 272, and a raised forward edge 274. Two spaced-apart legs 276 extend rearwardly from the body 270. At the end of each leg 276 there is formed a sidewardly-extending, U-shaped pivot bracket 278 that fits around the pivot boss 262 formed in each side wall of the top case 57.

Inside of each pivot bracket 278 on the legs of the strut 200 there is formed a rounded boss 280. The rearward terminus of each keycap 138, 142, is curved to fit partly around the upper surface of the boss 280, beneath the top case surface 206. Accordingly, the strut legs 276 secure the rearward ends of the keycaps 138, 142 while permitting the limited pivotal motion required by keycaps when depressed to activate the switches 84. For the purposes of this discussion, the axis defined by the pivot bosses 262 and about which the strut 200 pivots will be designated P1, the axis being normal to the plane of FIG. 7, hence appearing as a point in that FIG. 7.

Figure 10:
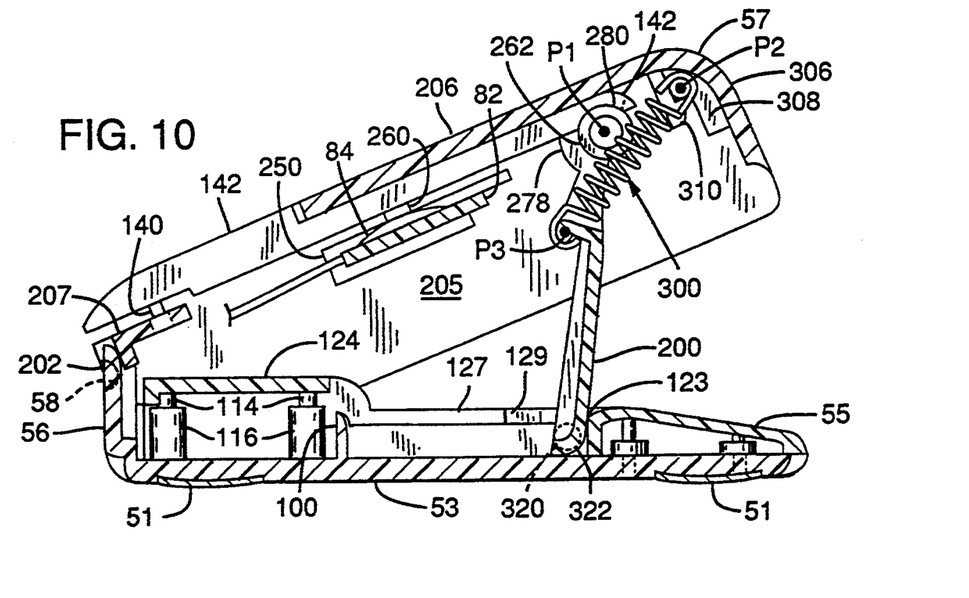
FIG. 10 is a cross sectional view taken along line 10—10 of FIG. 8, showing the handle in the expanded configuration. For clarity, one keycap 139 is omitted from this figure.

A tension spring 300 is hooked between the top case 57 and the strut 200 and is used both for urging the strut into a stowed position (FIG. 7) and for urging the strut into the support position (FIG. 10). The rearward end 304 of the spring is hooked around a shaft 302 that is fastened to the rearward end of the top case 57. More particularly, the rear wall 306 of the top case 57 has formed on its inside surface two inwardly projecting ribs 308 spaced closely together about the long center axis 86 of the top case (one rib appearing in FIG. 7).

The inner surfaces of the side walls 204, 205 of the top case have inwardly protruding snap hooks 310 (FIG. 7) formed therein, each snap hook being spaced forwardly from the rear wall 306 by an amount such that when the rigid shaft 302 is pressed between the ribs 308 and snap hooks 310 toward the upper surface 206 of the top case, the portion of the top case that supports the ribs 308 deforms by an amount sufficient to permit the shaft 302 to pass between the hooks and the ribs and thereafter resile to secure the shaft to the top case 57. The rearward end 304 of the spring is hooked between the ribs 308, therefore centered in the top case and unable to move laterally along the shaft 302. For the purposes of this discussion, the longitudinal axis of the shaft 302 about which the rearward end of the spring is hooked, is designated P2 (FIG. 7).

An alternative to the foregoing shaft, ribs, and hooks arrangement would substitute a bracket or boss formed with the top case 57 in the vicinity of the ribs 306 and shaped to define a post-like feature around which the end 304 of the spring is hooked.

The forward end 312 of the spring is hooked to the strut 200. In this regard, the portion of the spring 300 between its ends fits within the space between the two legs 276 of the strut. The body 270 of the strut has a upwardly projecting bracket 314 (FIG. 4) formed therein near the junction of the legs 276 and body. The forward-facing wall of the bracket 314 has a recess formed therein for receiving the hooked end 312 of the spring. For the purposes of this discussion, the lateral axis about which the end 312 of the spring is hooked is designated P3.

The forward end of the strut 200 carries two, opposed, outwardly protruding ears 320. Once the legs 276 of the strut are pivotally attached to the top case 57, the ears 320 are fit through an associated notch 129 formed in the inwardly protruding lips 127 in the top cover 55. Preferably, the forward portion (FIG. 4) of each ear 320 is beveled to define a width dimension between the forward portions of both ears that is slightly less than the width between the notches 129. The width dimension measured between the rearward portions of the ears is slightly greater than the width between the notches. As a result, the ears are forced through the notches 129, the forward end of the strut 200 will not become detached from the base 50.

With the forward end of the strut 200 connected to the base 50 as just described, the curved forward edge 322 on the underside of the strut is able to slide along the exposed surface 54 of the bottom member 53 as described below.

As noted above, FIGS. 1 and 7 depict the handle in the collapsed configuration. In the collapsed configuration, the strut 200 is in its stowed position. In the stowed position, the strut is swung about pivot axis P1 until the top case 57 contacts the base 50. While the strut is in the stowed position (FIG. 7) the line of action of the spring, which can be defined as the straight line normal to axes P2 and P3, passes slightly above the pivot point P1 thereby defining a relatively small static moment for keeping the strut in the stowed position. This static moment is small enough, however, to be easily overcome so that the handle can be moved into the expanded configuration merely by lifting the rearward end of the top case 57, whereby the strut 200 moves into the support position (FIG. 10).

In particular, whenever the one wishes to move the handle 30 from the collapsed to the expanded configuration, one simply grasps the sidewalls 204, 205 of the top case near the rear wall 306 and lifts upwardly. Preferably, ridges 326 are formed in at least one side wall 204 to provide a grip for lifting the top case 56, and to serve as an indicium of where the top case should be grasped for moving the handle to the expanded configuration.

As the top case 57 is lifted, the weight of the base 50 and attached link is sufficient to overcome the static moment applied by the spring 300 so that the top case 57 may be swung about the front hinge projections 202 through an angle of about 28° into the extended position (FIGS. 8 and 10).

As the rear of the top case 57 is lifted, the line of action of the spring 300 moves over center, that is, normal to pivot axis P1, and thereafter the spring is able to contract to rapidly rotate the strut about axis P1 until it is fully deployed into the support position shown in FIG. 10.

With the strut 200 in the support position (that is, with the handle in the expanded configuration) the strut is nearly vertical, its rearward motion limited by the forward and lateral edge 123 of the rear segment 125 of the base cover 55. Moreover, the static moment generated by the spring 300 when the strut 200 is in the support position is substantially greater than the static moment that exists when the strut is in the stowed position because, while the strut in the support position, the line of action of the spring is spaced from the pivot axis P1 by an amount that defines a moment arm that is about twice as long as the moment arm defined when the strut is in the support position.

With the handle in the expanded configuration, the user is able to comfortably drape two fingers over the surface 206 of the top case 57 with the fingertips resting upon the keycap tips 139, 143. It is noteworthy that because the strut 200 is near vertical when in the support position, a relatively high normal force is generated (hence, high frictional force between the strut and the surface 54) to provide sufficient support for the weight of the user's hand during operation of the handle.

It is contemplated that the rearward portion of the base 50 could be shortened so that the user could curl beneath the top case 57, his last two fingers without encountering the base.

To move the handle 30 from the expanded to the collapsed configuration, the user presses downwardly upon the rearward end of the top case. Sufficient downward force, which force is slightly greater than the weight of the hand that would rest upon the handle during use in the expanded configuration, overcomes the above-mentioned static moment and frictional force acting on the strut, and the forward edge 322 of the strut begins to slide forwardly along the smooth surface 54.

It will be appreciated that as the top case 57 moves from the expanded toward the collapsed position, the line of action of the spring 300 again passes over center, as defined above, and thereafter contracts to provide force for moving the strut into the stowed position and the handle into the collapsed configuration.

As described in U.S. patent application Ser. No. 07/856,436, the stowage compartment 38 includes a handle-receiving opening formed in the side wall of the housing 36. The underside of the stowage compartment 38 is generally open, except for a front guide rib 328 that protrudes rearwardly from the bottom edge of the forward end of the compartment 38, and a rear guide rib 330 that protrudes forwardly from the bottom edge of the rear end of the compartment. The collapsed handle 30 (FIG. 1) may be inserted into the stowage compartment 38. To this end, the front guide rib 328 fits within a correspondingly shaped elongated notch 340 that is formed in the forward, lower-most edge of the handle (FIG. 2). Similarly, the rear guide rib 330 fits within a correspondingly shaped elongated notch 341 formed in the rear of the handle 30.

A spring-biased latch 346 secures the handle 30 within the stowage compartment 38 whenever the handle is fully inserted therein. In this regard, the latch includes a toe 348 that protrudes into the stowage compartment just above the forward rib 328. From the toe 348 the latch 346 extends upwardly to connect with the eject button 40.

Whenever the handle 30 is inserted into the stowage compartment 38, the protruding latch toe 348 fits within the slot 107 that is formed in the handle. As best shown in FIGS. 1 and 2, the latch toe is shaped so that its upper surface 366 is sloped downwardly and outwardly at the portion of the toe that first engages the inserted handle 30. The slot 107 and latch toe 348 are configured and arranged so that as the handle is inserted into the stowage compartment 38, the inclined surface 366 of the toe contacts the upper inclined entry of the slot 107. Continued insertion of the handle therefore, develops a downward component of force against the latch toe 348 (which is resisted by an internal spring, not shown, that urges the eject button 40 upwardly). The latch toe 348 moves beneath the recess 172 that is formed in the forward end of the handle 30 to extend upwardly, contiguous with the upper part of the slot 107. The recess provides clearance for the latch toe 348 so that the internal spring is able to force the latch and eject button upwardly to the normal position. When the button is in the normal position, the latch toe 348 resides within the recess 172, preventing the handle from moving out of the compartment.

Preferably, the stowed handle is ejected slightly from the stowage compartment 38 whenever the eject button 40 is pressed. As a result, the user can quickly and easily grasp the handle and pull it to the fully extended or operating position. In the preferred embodiment, an internal, spring-loaded arm is mounted within the computer base 44 to contact the inner end 37 of the link 34 when the handle 30 is stowed. The contact effects a biasing force to the link for ejecting the stowed handle when the eject button 40 is pressed.

Although the foregoing invention has been described in connection with preferred and alternative embodiments, it will be appreciated by one of ordinary skill that various modifications and variations may be substituted for the mechanisms described here while remaining within the scope of the invention as defined by the appended claims and the equalivents thereof. For example, an alternative mechanism for moving the handle into the expanded position might include an internal spring for continuously urging apart the rearward ends of the top case and base. A releasable latch would serve to maintain such a handle in the collapsed position. Moreover, linkage could be substituted for the hinged top case and base connection, thereby allowing handle expansion via traslational lifting of the top case.

The invention claimed is:

1. A collapsible and expandable input device for a position encoder system comprising: a base;

a top connected at a first end to the base for motion relative to the base, the top being movable into a first position wherein a second end of the top is adjacent to the base and into a second position wherein the second end of the top is spaced from the base; and support means for supporting the top in the second position.

2. The device of claim 1 wherein the support means includes a strut that is pivotally attached to the device between the top and base for movement into and out of a support position, the strut supporting the top in the second position when the strut is in the support position.

3. The device of claim 2 including a spring member connected between the strut and the device and arranged for urging the strut into the support position as the top is moved toward the second position.

4. The device of claim 2 wherein the strut is movable out of the support position into a stowed position, thereby to permit the second end of the top to move adjacent to the base so that the top may assume the first position.

5. The device of claim 4 including a spring member connected to the strut and to the device and arranged for urging the strut into the stowed position as the top is moved toward the first position.

6. The device of claim 5 wherein the top first end is pivotally connected to the base to remain adjacent thereto when the top is in the second position and wherein the spring member is arranged for urging the strut into the support position as the top is moved toward the second position.

7. The device of claim 2 wherein the strut is pivotally attached at one end to the top and wherein another end of the strut is retained adjacent to the base for sliding movement relative to the base as the strut moves into and out of the support position.

8. The device of claim 1 wherein the support means includes expansion means for allowing the top to be moved from the first position to the second position as a result of lifting the second end of the top and for allowing the top to be moved from the second position to the first position as a result of pressing the second end of the top toward the base.

9. An input device that is connectable to a computer for use with a position encoder system, comprising:

a base;

a top that is attached to the base, the top being movable relative to the base into a collapsed position and into an expanded position, wherein movement of the top from the expanded to the collapsed position increases the compactness of the device; and a link member connected between the device and the computer, the link member including a conductor for conducting electronic signals between the device and the computer.

10. The device of claim 9 wherein the link member is pivotally connected at an outer end to the device to permit pivotal movement of the device relative to the link member, the link member protruding from the device for connection with the computer.

11. The device of claim 10 wherein the link member includes a flexible extension of the outer end, the flexible extension carrying a switch and being fastened within the device so that the switch can be activated by the user of the device.

12. The device of claim 11 wherein the flexible extension is arranged within the device to move with the pivotal motion of the device and to move with the top relative to the base.

13. The device of claim 9 including a strut that is pivotally connected to the device about a pivot axis for movement into and out of a support position, the strut being configured for supporting the top in the expanded position whenever the strut is in the support position.

14. The device of claim 13 wherein the top first end is pivotally connected to the base to remain adjacent thereto when the top is in the second position and wherein the strut is movable out of the support position into a stowed position to allow movement of the top into the collapsed position.

15. The device of claim 13 including a spring element carried by the device and arranged for urging the strut into the support position as the top is moved toward the expanded position.

16. The device of claim 14 wherein a spring element is carried by the device and arranged for urging the strut into the stowed position as the top is moved toward the collapsed position.

17. The device of claim 13 wherein the strut is movable about the pivot axis out of the support position into a stowed position to allow movement of the top into the collapsed position, the device further including a spring element arranged for urging the strut into the support position as the top is moved toward the expanded position and for urging the strut into the stowed position as the top is moved toward the collapsed position.

18. The device of claim 17 wherein the spring element is connected between the top and the strut to define a first static moment about the pivot axis when the top is in the collapsed position and to define a second static moment about the axis when the top is in the expanded position, the magnitude of the first static moment being less than the magnitude of the second static moment.

19. The device of claim 13 wherein the strut is pivotally attached at a first end to the top and wherein a second end of the strut is slidable along the base, the strut being arranged so that force applied to the top to move the top toward the collapsed position causes the second end to slide along the base.

20. A method of manufacturing an input device for a position encoder system for a computer, wherein the device may be changed from a collapsed configuration to a relatively larger expanded configuration, comprising the steps of:
providing a base;
mounting to the base for motion relative thereto a top;
connecting an electronic switch to the top; and
attaching for movement between the top and the base a support member for supporting part of the top in an expanded position in which one end of the top is spaced from the base, the support member being attached for movement out of the support position so that the end of the top is movable toward the base thereby to change the device into a configuration that is more compact than the configuration assumed by the device when the top is supported in the expanded position.

* * * * *